United States Patent
Meixner (10) Patent No.: US 10,315,502 B2
(45) Date of Patent: Jun. 11, 2019

(54) GEARING DEVICE FOR A MOTOR VEHICLE

(71) Applicant: AUDI AG, Ingolstadt (DE)

(72) Inventor: Christian Meixner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 101 days.

(21) Appl. No.: 15/522,027

(22) PCT Filed: Oct. 29, 2015

(86) PCT No.: PCT/EP2015/075069
§ 371 (c)(1),
(2) Date: Apr. 26, 2017

(87) PCT Pub. No.: WO2016/066732
PCT Pub. Date: May 6, 2016

(65) Prior Publication Data
US 2017/0313172 A1   Nov. 2, 2017

(30) Foreign Application Priority Data

Oct. 29, 2014   (DE) .................. 10 2014 016 077

(51) Int. Cl.
*F16H 3/72* (2006.01)
*B60K 6/365* (2007.10)
(Continued)

(52) U.S. Cl.
CPC .............. *B60K 6/365* (2013.01); *B60K 6/387* (2013.01); *B60K 6/48* (2013.01); *B60K 6/547* (2013.01); *F16H 3/666* (2013.01); *F16H 37/082* (2013.01); *F16H 48/11* (2013.01); *B60K 2006/4808* (2013.01); *B60K 2006/4833* (2013.01); *B60Y 2200/92* (2013.01); *B60Y 2400/804* (2013.01);
(Continued)

(58) Field of Classification Search
CPC ................................ F16D 63/002; F16H 3/725
See application file for complete search history.

(56) References Cited

U.S. PATENT DOCUMENTS 8,328,672 B2   12/2012   Akutsu et al.
9,701,187 B2 *   7/2017   Smetana .................. B60K 6/48

FOREIGN PATENT DOCUMENTS

CN   101963213 A   2/2011
CN   102107604 A   6/2011
(Continued)

OTHER PUBLICATIONS

Translation of the International Preliminary Report on Patentability dated May 11, 2017, in connection with corresponding international Application No. PCT/EP2015/075069 (11 pgs.).
(Continued)

*Primary Examiner* — Derek D Knight
(74) *Attorney, Agent, or Firm* — Maier & Maier, PLLC (57) ABSTRACT

A gearing device for a motor vehicle, which is equipped with an input shaft that can be operationally connected to a drive unit, as well as a first output shaft and a second output shaft, wherein the first output shaft is connected or can be connected via a first gear with a first partial shaft of a wheel axle and the second output shaft is operationally connected or can be operationally connected via a second gear with a second partial shaft of the wheel axle.

10 Claims, 6 Drawing Sheets

(51) Int. Cl.
*B60K 6/387* (2007.10)
*B60K 6/48* (2007.10)
*B60K 6/547* (2007.10)
*F16H 3/66* (2006.01)
*F16H 37/08* (2006.01)
*F16H 48/11* (2012.01)
*F16H 48/10* (2012.01)
*F16H 48/36* (2012.01)

(52) U.S. Cl.
CPC ........ *F16H 48/10* (2013.01); *F16H 2048/108* (2013.01); *F16H 2048/364* (2013.01); *Y02T 10/626* (2013.01); *Y02T 10/6221* (2013.01); *Y10S 903/911* (2013.01); *Y10S 903/919* (2013.01)

(56) References Cited

FOREIGN PATENT DOCUMENTS

| DE | 102009056366 A1 | 6/2011 |
| DE | 102010036240 A1 | 3/2012 |
| DE | 102013202382 A1 | 8/2014 |

OTHER PUBLICATIONS

International Search Report dated Jan. 12, 2016 of corresponding application No. PCT/EP2015/075069; 14 pgs.
Chinese Office Action dated Sep. 29, 2018, in connection with corresponding CN Application No. 201580058892.3 (13 pgs., including machine-generated English translation).

* cited by examiner

GEARING DEVICE FOR A MOTOR VEHICLE

BACKGROUND

The invention relates to a gearing device for a motor vehicle, which is provided with an input shaft that can be operatively connected to a drive unit, as well as a first output shaft and a second output shaft, wherein the first output shaft is operatively connectable or connected via a first gear to a first partial shaft of a wheel axle, and the second output shaft is operatively connected via a second gear to a second partial shaft of the wheel axles.

Such a gearing device is used for example to transmit a torque between the drive unit of the motor vehicle on the one hand and the wheel axle of the motor vehicle on the other hand. The wheel axle is either operatively connectable via the gearing device to the drive unit, or it is connected to it. Accordingly, the wheel axle is provided as a driven wheel axle and it can be designed as a front axle or as a rear axle of the motor vehicle. The input shaft of the gearing device is provided both with the first output shaft and with the second output shaft.

The input shaft is connected to the drive unit, or it is operatively connectable to it. In the operative connection between the input shaft of the gearing device and the drive unit is preferably provided a manual transmission and/or a clutch, in particular a starting clutch. The drive unit can be configured as a combustion engine, as an electrical engine or as a hybrid drive unit, wherein the hybrid drive unit is preferably equipped both with a combustion engine and with an electrical engine.

The wheel axle of the motor vehicle is provided with a first partial axle and with a second partial axle, wherein each of the partial axles is preferably assigned a wheel of the motor vehicle. The first output axle is operatively connected or connectable via the first transmission to the first partial shaft and the second output shaft is operatively connected or connectable to the second transmission with the second partial shaft. A conversion is thus made by means of the gearing from the first output shaft to the first partial shaft and from the second output shaft to the second partial shaft. The transmissions are preferably provided with the same transmission ratio.

SUMMARY OF THE DISCLOSURE

The object of the invention is to provide a gearing or gearing device which has an advantage over known gearing devices, in particular in that it realizes in a simple and space-saving manner "torque vectoring" functionality on the wheel axle.

This is achieved with a gearing device having the features of claim 1. At the same time, the gearing device is provided with a differential transmission by means of which the first output shaft and the second output shaft are permanently connected with the input shaft, and the gearing device is provided with an electrical engine, which is operatively connectable, preferably directly, via a first clutch and with a first transmission ratio, to the input shaft, and via a second clutch and with a second transmission ratio, preferable directly, with a torque distribution transmission of the gearing device.

In this respect, the gearing device combines together the differential gear and the torque distribution gear. The differential gear in this case provides the functionality of an axle differential gear for the wheel axle and thus for both partial shafts of the wheel axles.

On the other hand, the "torque vectoring" functionality can be provided by means of the torque distribution gear for the wheel axles and thus also for both partial shafts. The input shaft is rigidly and/or permanently connected via the differential gear both to the first output shaft and to the second output shaft, in particular directly. Under the term direct operational connection is to be understood the fact that the input shaft, the first output shaft and the second output shaft are directly connected to the differential gear.

When necessary, the torque provided via the input shaft can be divided by means of the torque distribution gear between the first partial shaft and the second partial shaft. The electrical engine, which is operatively connectable with the torque distribution gear by means of the second clutch, is provided for this purpose. With a corresponding control of the electrical engine while an operational connection is provided at the same time between the electrical engine and the torque distribution gear, the torque distribution mentioned above can be implemented and the "torque vectoring" functionality can be realized accordingly.

In addition, the gearing device is provided with the first clutch. The electrical engine can be operatively connected or is connectable via this clutch to the input shaft. Under the term direct connection should in this case be understood an operational connection which does not pass through the differential or the torque distribution gear. The operational connection between the electrical engine and the input shaft via the first clutch can be realized with the first transmission ratio, while the second transmission ratio is present between the electrical engine and the torque transmission gear. For example, the first transmission ratio and the second transmission ratio are different from each other. However, identical transmission ratios can be also realized.

It is particularly preferred when the first transmission ratio equals one, so that no additional gear stages or gear shifting is necessary. On the other hand, the first transmission ratio is different from one, for example so that a transmission ratio of $\sqrt{8}$ or i=8 is provided. In particular, the first transmission ratio is realized by means of at least one transmission stage or gearwheel stage, which is for this purpose arranged in the operational connection between the electrical engine and the input shaft. It is particularly preferred when the gear stage is arranged between the electrical engine and the first clutch. However, it is also possible to provide an arrangement in which the operational connection is provided between the first clutch and the input shaft.

By connecting the electrical engine to the input shaft via the first clutch, it is possible for example to support an electric motor driving operation of the motor vehicle, wherein the torque supplied from the electrical engine can be superimposed on the torque that is provided at the input shaft. In this respect, the torque applied at the input shaft can be generated jointly by the drive unit and by the electrical engine. It is of course also possible to operate the electrical engine as a generator that is used in order to provide electrical energy.

The first gear and the second gear can be essentially designed with any configuration. For example, they can be provided as spur gear units. In this case, the first output shaft is preferably arranged parallel to the first partial shaft and the second output shaft is preferably arranged parallel to the second partial shaft. However, it is also possible that the partial shafts of the wheel axle and the output shafts of the gearing device are mutually enclosed and arranged at an angle that is larger than zero and smaller than 180 degrees.

It can be for example an angle of 90 degrees, so that the partial shafts of the wheel axis are then in each case arranged at right angle to the corresponding output shaft. With an angled arrangement, at least one of the corresponding partial shafts can be provided as an angled gear. For example, both gears are designed as angled gears, in particular as bevel gears.

For example, the partial shafts of the wheel axle are arranged at right angle to a longitudinal axis of the motor vehicle. This may also apply to the output shaft as mentioned in the embodiments above. However, it is also possible for the two output shafts to be arranged in the direction of the longitudinal central axis, or substantially parallel to the longitudinal central axis. It is in particular preferred when the output shafts of the gearing device extend coaxially to one another, or parallel to one another. The gearing device is arranged in an operational connection between the drive unit and the gears. A compact construction of the wheel axles is thus ensured with such an arrangement of the gearing device.

In a particularly preferred embodiment of the invention, multiple clutches can be provided, through which the electrical engine can be connected directly to the input shafts with mutually different transmission ratios. A first transmission ratio is thus provided when an operational connection is established between the electrical engine and one of these clutches. On the other hand, when an operational connection is created between another of the first clutches, one of them will have a different transmission ratio. Therefore, a desired transmission ratio between the electrical engine and the input shaft can be selected from a plurality of available transmission ratios and the corresponding clutch can be then activated after that in order to realize the desired transmission ratio.

The invention of course also relates to a motor vehicle provided with a gearing device, which is preferably designed according to the description. The motor vehicle is provided with a wheel axle having the first partial axle and the second partial axle. The gearing device is equipped with an input shaft that can be operatively connected via a drive unit of the motor vehicle, as well as with a first output shaft and a second output shaft, wherein the first output shaft is operatively connected via a first transmission with the first partial shaft of a wheel axle of the motor vehicle, and the second output shaft is operatively connected via a second transmission with a second partial shaft of the wheel axle.

In this case, the gearing device is provided with a differential gear, by means of which the first output shaft and the second output shaft are operatively connected in a permanent manner to the input shaft, and the gearing device is equipped with an electrical engine, which is operatively connectable via a first clutch and a first transmission ratio directly to the input shaft, and via a second clutch with a second transmission ratio directly to a torque distribution gear of the gearing device. The motor vehicle or the gearing device can be further developed according to the present invention.

According to a further embodiment of the invention, the differential gear is provided as a planetary gear equipped with a differential gear ring wheel, a differential gear planetary carrier and a differential gear sun wheel, wherein the input shaft is operatively connected directly to the differential gear ring wheel, and the differential gear sun wheel is operatively connected to the second output shaft. The term direct operational connection is in this context to be understood to mean that the direct operational connection is present in each case between said shaft and said wheel of the differential gear and not only provided via a differential gear. In this respect, the input shaft is connected with the differential gear ring wheel, and the differential gear planetary carrier is connected with the second output shaft, or it is connected to the respective shaft. The operational connection is in each case designed as a rigid and/or permanent connection.

According to another embodiment of the invention, the differential gear planetary carrier is operationally connected to at least a differential gear inner planetary wheel, a differential gear planetary gear wheel meshing with a rotatably mounted a differential gear outer planetary wheel, wherein the differential gear outer planetary wheel is meshing with the differential gear ring wheel and the differential gear inner planetary gear wheel is meshing with the differential gear sun wheel. The differential gear is in this context designed as a double planetary gear. Accordingly, the differential gear inner planetary wheel is also provided with a differential gear outer planetary wheel, by means of which the differential gear ring wheel and the differential gear sun wheel are in operational connection.

Both the differential gear inner planetary wheel and the differential gear outer planetary gear are rotatably arranged or mounted on the differential gear planetary carrier. They mesh with each other, while at the same time, the differential gear outer planetary wheel meshes with the differential gear ring wheel, and the differential gear inner planetary wheel meshes with the differential gear sun wheel, or is engaged in it. The differential gear outer planetary wheel and the differential gear inner planetary wheel can be arranged at different radial positions with respect to the axis of rotation of the differential gear planetary carrier.

According to another embodiment of the invention, the torque distribution gear is directly connected to the second output shaft and indirectly to the first output shaft via the differential gear. This means that while the second output shaft is connected directly to an element of the torque distribution gear, the operational connection is provided between the first output shaft and the torque distribution gear only via the differential gear and therefore indirectly.

In another preferred embodiment of the invention, the torque distribution gear is provided as a planetary gear, which is equipped with a torque distribution gear ring wheel, a torque distribution gear planetary carrier and a torque distribution gear sun wheel, wherein the torque distribution gear ring wheel is connected directly to the differential gear, the torque distribution gear planetary carrier is connect directly to the second output shaft, and the torque distribution gear sun wheel is indirectly connected via the second clutch to the electrical engine with an operational connection.

In this respect, the torque distribution gear is also designed as a planetary gear and it is accordingly equipped with the ring wheel, the planetary carrier and the sun wheel. Once again, under the term direct operational connection is to be understood the fact that this connection is not provided through the torque distribution gear, but that the operational connection is provided between the torque distribution gear ring wheel and the differential gear, and that the operational connection is provided between the torque distribution gear planetary carrier and the second output shaft, preferably each time as a rigid and/permanent connection. Although the operational connection between the electrical engine and the torque distribution gear sun wheel can be established also indirectly, it is or can be interrupted by means of the second clutch.

According to a preferred embodiment of the invention, on the torque distribution gear planetary carrier is rotatably mounted a torque distribution gear inner planetary gear and a torque distribution gear outer planetary wheel that meshes with the torque distribution gear inner planetary wheel, wherein the torque distribution gear inner planetary wheel meshes with the torque distribution sun wheel. The torque distribution gear is thus provided with a double planetary gear. This means that the torque distribution gear inner planetary wheel and the torque distribution gear outer planetary gear are provided on the torque distribution gear planetary gear and rotatably mounted there. The torque distribution gear inner planetary gear and the torque distribution gear outer planetary wheel are mutually meshing and they are in this case arranged at different radial positions with respect to the axis of rotation of the torque distribution gear planetary carrier. The torque distribution gear inner planetary wheel now meshes with the torque distribution gear sun wheel. According to another development of the invention, the torque distribution gear outer planetary wheel meshes with the torque distribution gear ring wheel, or it is operatively connected to an auxiliary planetary wheel that meshes with the torque distribution gear ring wheel. In either case, a direct operational connection is provided between the torque distribution gear outer planetary wheel and the torque distribution gear ring wheel. Both torque distribution gear planetary wheels either mesh directly with each other, or the torque distribution gear outer planetary wheel is assigned to the auxiliary planetary gear, which meshes with the torque distribution gear ring wheel or engages with it.

The auxiliary planetary gear is preferably rigidly and/or permanently operatively connected with the torque distribution gear outer planetary wheel and it is in this case in particular provided with the same axis of rotation. It is preferred when the auxiliary planetary wheel is also rotatably mounted on the torque distribution planetary carrier. For example, the auxiliary planetary wheel can be formed integrally with the torque distribution gear outer planetary wheel, or it can be a constituent part thereof.

In another preferred embodiment of the invention, the differential gear and the torque distribution gear are connected via an intermediate gear with an operational connection, which is provided as a planetary gear, and an intermediate gear sun wheel is provided is provided with an intermediary planetary carrier and an intermediary gear ring wheel, wherein on the intermediary gear planetary carrier is rotatably mounted an intermediate gear planetary gear that meshes with the intermediary gear wheel and with the intermediary ear ring wheel. The direct operational connection is thus created between the torque distribution gear and the differential gear via the intermediate gear.

The differential gear is also provided as a planetary gear and accordingly, it is equipped with the intermediate gear sun wheel, the intermediate gear planetary carrier and the intermediate gear ring wheel. On the intermediate gear planetary carrier is arranged or rotatably mounted the intermediate planetary gear. It meshes both with the intermediate gear sun wheel and with the intermediate gear ring wheel.

According to another embodiment of the invention, the intermediate gear planetary carrier is connected directly with an operational connection to the differential gear planetary carrier, the intermediate gear sun while is connected with the torque distribution ring wheel and/or the intermediate gear ring wheel is connected directly with the torque distribution gear planetary carrier. When the operational connection is provided between the intermediary planetary carrier and the differential gear planetary carrier, the intermediary gear planetary wheel can have a common axis of rotation with the differential gear inner planetary wheel or with the differential gear outer planetary gear. In particular, for this purpose it is mounted directly on the differential gear planetary carrier, so that the differential gear planetary carrier and the intermediate gear planetary carrier are designed in this respect as common planetary carriers.

Additionally or alternatively, the intermediate gear sun wheel is operatively connected directly with the torque distribution gear ring wheel. Optionally, the intermediate gear ring wheel can be also be directly operatively connected with the torque distribution gear planetary carrier. It is preferred when at least two, in particular all the three named variants are realized, so that the intermediate gear is operatively connected via one operational connection with the differential gear and via two operational connections with the torque distribution gear.

Finally, in a preferred embodiment of the invention, the torque distribution gear is provided as a planetary gear having a first planetary wheel set and a second planetary wheel set, wherein the first planetary wheel set is equipped with a first torque distribution gear ring wheel, a first torque distribution gear planetary carrier and a first torque distribution gear sun wheel, and wherein the second planetary wheel set is equipped with a second torque distribution gear ring wheel, a second torque distribution gear planetary carrier and a second torque distribution gear sun wheel. The torque distribution gear is thus provided as a combination of two planetary gears with the first planetary wheel set and with the second planetary wheel set.

Each planetary wheel set is provided with a ring wheel, a planetary carrier and a sun wheel, wherein on the planetary carrier is in each case rotatably mounted at least one planetary gear. For example, in this case the first torque distribution gear ring wheel and the second torque distribution gear ring wheel are designed as a common torque distribution gear ring wheel or at least they are connected to each other with an operational connection. In the latter case, the torque distribution ring wheels can be arranged in axial direction with respect to their axis of rotation spaced at a distance from each other, The first torque distribution gear ring wheel and the second torque distribution gear ring wheel are preferably arranged coaxially to each other, and thus they have the same axis of rotation.

In another preferred embodiment of the invention, a first torque distribution gear planetary gear wheel is rotationally mounted on the first torque distribution planetary carrier and a second torque distribution planetary wheel is rotationally mounted on the second torque distribution gear planetary carrier, wherein the first torque distribution gear planetary wheel meshes with the first torque distribution gear ring wheel, as well as with the first torque distribution gear sun wheel, and the second torque distribution gear planetary wheel meshes with the second torque distribution gear ring wheel, and with the second torque distribution gear sun wheel. In this respect, the usual design of a planetary gear is again provided.

In a further development of the invention, the first torque distribution gear planetary carrier is connected directly with an operational connection to the intermediate gear sun wheel and/or the secondary torque distribution gear planetary carrier is connected directly with an operational connection to the intermediate gear ring wheel. Therefore, two operational connection are provided between the torque distribution gear and the intermediate gear. The operational connections are designed for example in each case as rigid and/or permanent connections.

In a preferred embodiment of the invention, the electrical engine can be operatively connected directly via the second clutch with the second transmission ratio and again with the second transmission ratio with the first torque distribution gear sun wheel and via another second clutch, and with another second transmission ratio with the second torque distribution sun wheel. Accordingly, as described in the embodiments above, a first clutch or several first clutches can be realized on the one hand, while at least one second clutch or several second clutches can be also realized on the other hand. By closing the second clutch and/or the other second clutch, the torque can be distributed by means of the torque distribution gear more precisely to the first partial shaft and to the second partial clutch than what was possible with only a single second clutch.

Finally, in yet another preferred embodiment of the invention, the intermediate planetary wheel is rigidly connected with the differential gear planetary wheel. Such an embodiment was already referred to above. For example, the intermediate gear planetary wheel and the differential gear planetary wheel are designed as a common planetary wheel. Alternatively, they can be of course also arranged at a distance from each other in axial direction with respect to their axis of rotation.

BRIEF DESCRIPTION OF THE DRAWING

The invention will now be explained in more detail below with reference to embodiment illustrated in the figure, without limiting the invention in this manner.

DETAILED DESCRIPTION OF THE DRAWING

Figure 1:
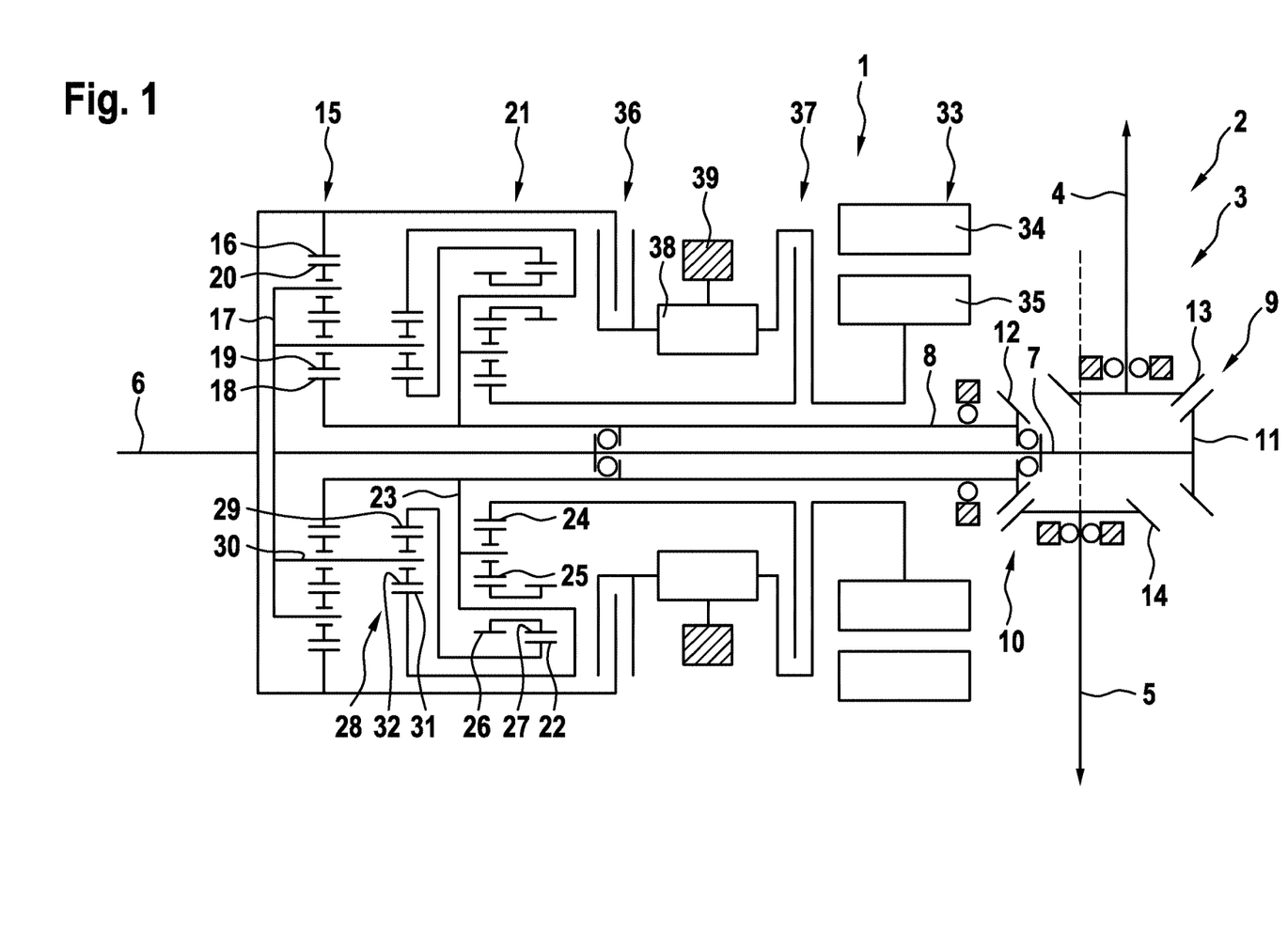
FIG. 1 a gearing device for a motor vehicle in a first embodiment,
FIG. 2 the gearing device in a second embodiment,
FIG. 3 a third embodiment of the gearing device,
FIG. 4 a fourth embodiment of the gearing device,
FIG. 5 the gearing device in a fifth embodiment,
FIG. 6 the gearing device in a sixth embodiment.

FIG. 1 shows a first embodiment of a gearing device, 1, which is here provided for example as a component of a motor vehicle 2, not shown here in more detail. The motor vehicle 2 is equipped with a wheel axle 3 that is provided with a first partial shaft 4 and with a second partial shaft 5. The wheel axle 3 or the partial axles 4 and 5 can be driven via the gearing device 1 by means of a drive unit of the motor vehicle 2. The drive unit is or can be in this case connected with an input shaft 6 of the gearing device 1. The first partial shaft 4, on the other hand, is connected to the first output shaft 7, and to the second partial shaft 5 on a second output shaft 8 of the transmission 1 that is connected or can be operationally connected with the output shaft 7 or 8.

The operational connection between the first partial shaft 4 and the first output shaft 7 is established via a first transmission 9, which creates an operational connection between the second partial shaft 5 and the second output shaft 8 via a second transmission 10. The transmissions 9 and 10 can be provided in the form of angular gears. At the same time, they are preferably designed as bevel gears and in this respect they are equipped with a respective first bevel gear 11 or 12 and a second bevel gear 13 or 14. According to the present embodiment of the gearing device 1, the partial shafts 4 and 5 can be arranged respectively in lateral or radial direction with respect to the axis of rotation. However, the partial shafts 4 and 5 can be alternatively also arranged coaxially to each other, which is to say that they have a common axis of rotation.

The output shafts 7 and 8 can be arranged at an angle with respect to partial shafts 4 and 5, or relative to the wheel axle 3, and positioned at an angle of more than 0° and less than 180°, for example less than an angle of 90°. The corresponding deflection is realized by means of the gears 9 and 10, which are present in the form angular gears. It goes without saying that the gears 9 and 10 can be alternatively realized also as spur wheel transmissions. For example, the output shafts 7 and 8 are here arranged parallel to the partial shaft 4 and 5.

The gearing device 1 is provided with a differential gear 15, through which the first output shaft 7 and the second output shaft 8 are permanently operationally connected with the input shaft 6. For this purpose, the differential gear 15 is preferably designed as a planetary gear, which is equipped with a differential gear ring wheel 16, a differential gear planetary carrier 17 and a differential gear sun wheel 18. At least one differential gear inner planetary wheel 19 as well as a differential gear outer planetary wheel 20 are rotationally mounted on the differential gear planetary carrier 17. The differential gear outer planetary wheel 20 is in this case arranged in radial direction with respect to one axis of rotation of the differential gear planetary carrier 17 so that it is located more radially outward than the differential gear inner planetary wheel 19. The differential gear inner planetary wheel 19 meshes with the differential gear sun wheel 18 and with the differential gear outer planetary wheel 20. The latter meshes again with the differential gear ring wheel 16.

It is in this case preferred when the input shaft 6 is operationally connected directly with the differential gear ring wheel 16, in particular rigidly and/or permanently. The differential gear planetary carrier 17 is preferably operationally connected directly with the first output shaft 7 and the differential gear sun wheel 18 is preferably operationally connected with the second output shaft 8, for example also with a rigid and/or permanent connection. The gearing device 1 is thus further provided with a torque distribution gear 21, which is also provided as a planetary gear. The torque distribution gear 21 is provided with a torque distribution gear ring wheel 22, a torque distribution gear planetary carrier 23 and a torque distribution gear sun wheel 24.

On the torque distribution gear planetary carrier 23 is rotatably mounted at least one torque distribution gear inner planetary wheel 25, as well as at least one torque distribution gear outer planetary wheel 26. The torque distribution gear inner planetary wheel 25 therefore meshes with the torque distribution gear sun wheel 24, as well as with the torque distribution gear outer planetary wheel 26. The latter meshes with the torque distribution gear ring wheel 22, or it is alternatively—as provided here—operationally connected with an auxiliary wheel 27, which meshes with the torque distribution gear ring wheel 22.

The differential gear 15 and the torque distribution gear 21 are operationally connected to each other via an intermediate gear 28. This gear is also designed as a planetary gear and it is in this respect provided with an intermediate gear sun wheel 29, an intermediate gear planetary carrier 30, as well as with an intermediate gear ring wheel 31. On an intermediate gear planetary carrier 30 is rotatably mounted an intermediate gear planetary wheel 32, which meshes with the intermediate gear sun wheel 29 and with the intermediate gear ring wheel 31.

The intermediate gear planetary carrier 30 is now operationally connected directly to the differential gear planetary carrier 17, in particular rigidly and/or permanently. For example, the differential gear inner planetary wheel 19 or the differential gear outer planetary 20 wheel are mounted on one side, together with the intermediate gear planetary wheel 32 on the other side, so that they have the in this respect the same axis of rotation. In other words, this means that the intermediate gear planetary wheel 32 is mounted on the differential gear planetary carrier 17, so that the intermediate gear planetary carrier 32 and the differential gear planetary carrier 30 and the differential gear planetary carrier 17 are designed as a common planetary carrier.

The intermediate gear sun wheel 29 is operationally connected directly to the torque distribution gear ring wheel 22, in particular rigidly or permanently. Additionally or as an alternative, the intermediate gear ring 31 is also operationally connected directly to the torque distribution gear planetary carrier 23, preferably also rigidly and/or permanently.

The is gearing device 1 is further equipped with an electrical engine 1, which is here suggested by a stator 34 and a rotor 35. In addition, a first clutch 36 and a second clutch 37 are provided. The electrical engine 33 can be operationally connected by means of the first clutch 36 directly to the input shaft 6, preferably with a first transmission ratio, which is realized for example by means of a transmission stage 38. The transmission stage 38 can be provided with at least one planetary gear, wherein preferably a ring wheel of the planetary gear is fixed, in particular with respect to a housing 39 of the gearing device 1.

On the other hand, the electrical engine 33 can be operationally connected to the torque distribution gear 21 via the second clutch 37 so that a second transmission ratio is provided. The second transmission ratio can be different from the first transmission ratio, in particular the second transmission ratio equals one. It is preferred when the electrical engine 33 can be operationally connected via the second clutch 37 directly to the torque distribution sun wheel 24.

Both the functionality of the differential gear 15 as well as a "torque vectoring" functionality can thus be realized by means of the gearing device 1 provided here while using the torque distribution gear 21. The electrical engine 33 is in this case used either to adjust the desired distribution of the torque applied to the input shaft 6 on the first output shaft 7 and the second output shaft 7 and the second output shaft 8 by means of the torque distribution gear 21. Alternatively, it could be coupled via the first coupling 36 directly to the input shaft 6, so that it can be used on the one hand to provide the torque at the input shaft 6, or on the other hand to provide electrical energy in a generator operation.

Figure 2:
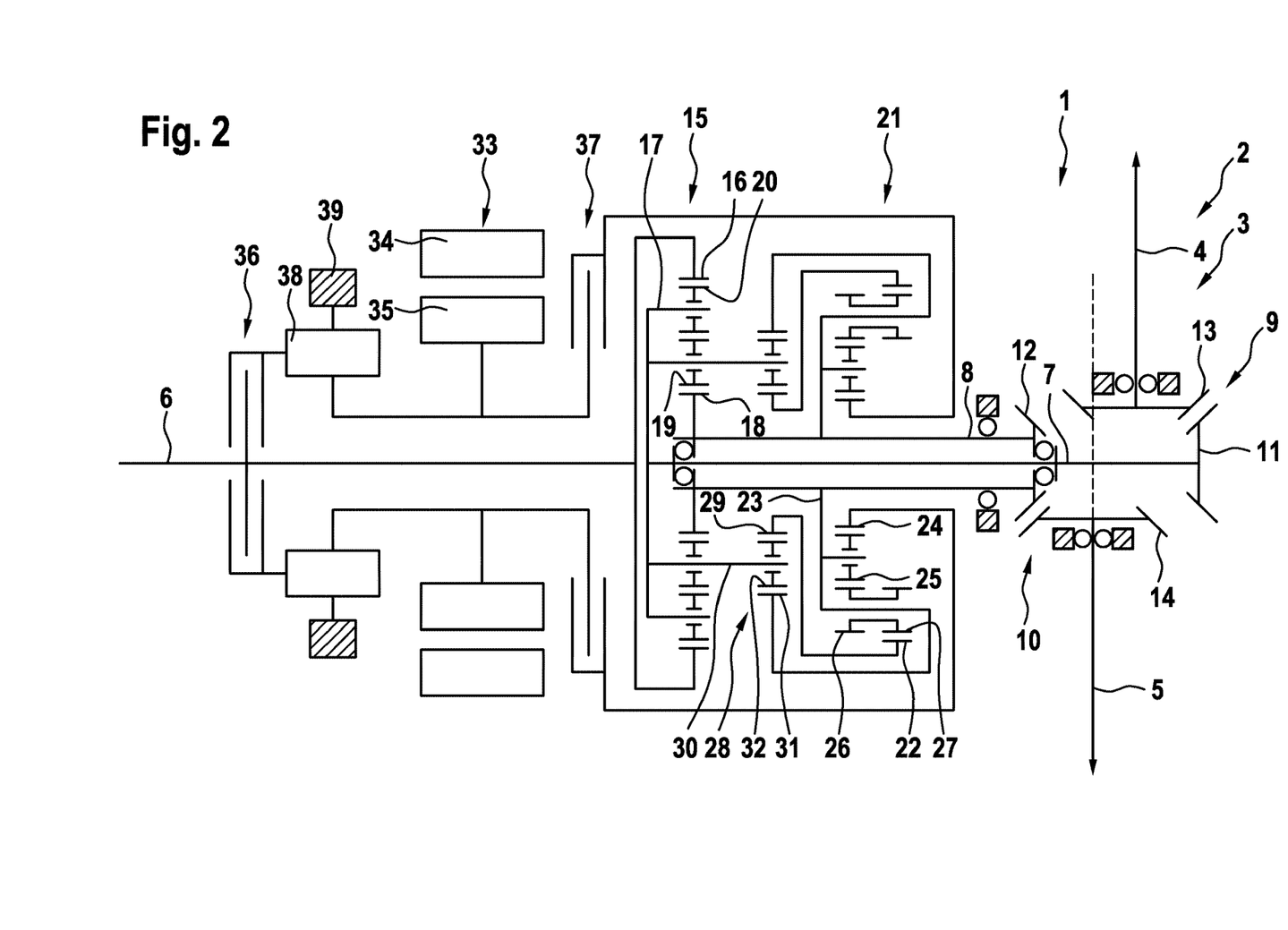

FIG. 2 shows a second variant of the gearing device 1, wherein this variant is designed similarly to the first embodiment so that the explanations above are referred to in this respect. The difference is that an alternative arrangement of the electrical engine 33 and of the first clutch 36 and of the second clutch 37 is provided.

Figure 3:
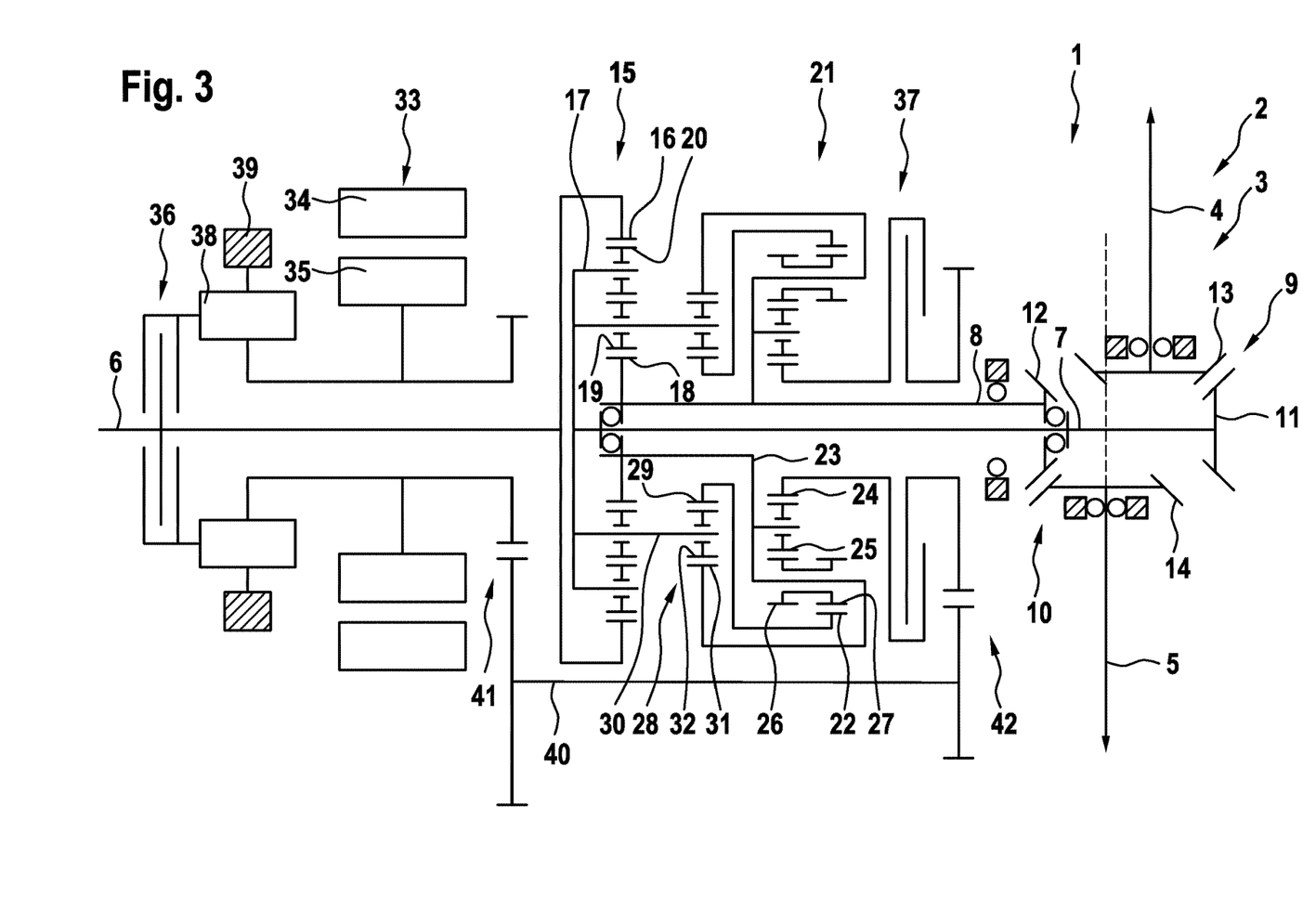

FIG. 3 shows a third embodiment of the gearing device 1, which is similar to the second embodiment. Only the differences will be therefore discussed in the following. It is evident that the alternative arrangement of the individual elements is achieved, in particular of the electrical engine 32, wherein an existing shaft is provided by means of which the electrical engine 33 is operationally connected with the second clutch 37, preferably rigidly and/or permanently. The existing shaft 40 is in this case connected via a first gear stage 41 to the electrical engine 33 and via a second gear stage 42 to the second clutch 37. In this respect, a second transmission ratio can thus be realized in the variant illustrated here in a simple manner, which is also different from a transmission ratio of one.

Figure 4:
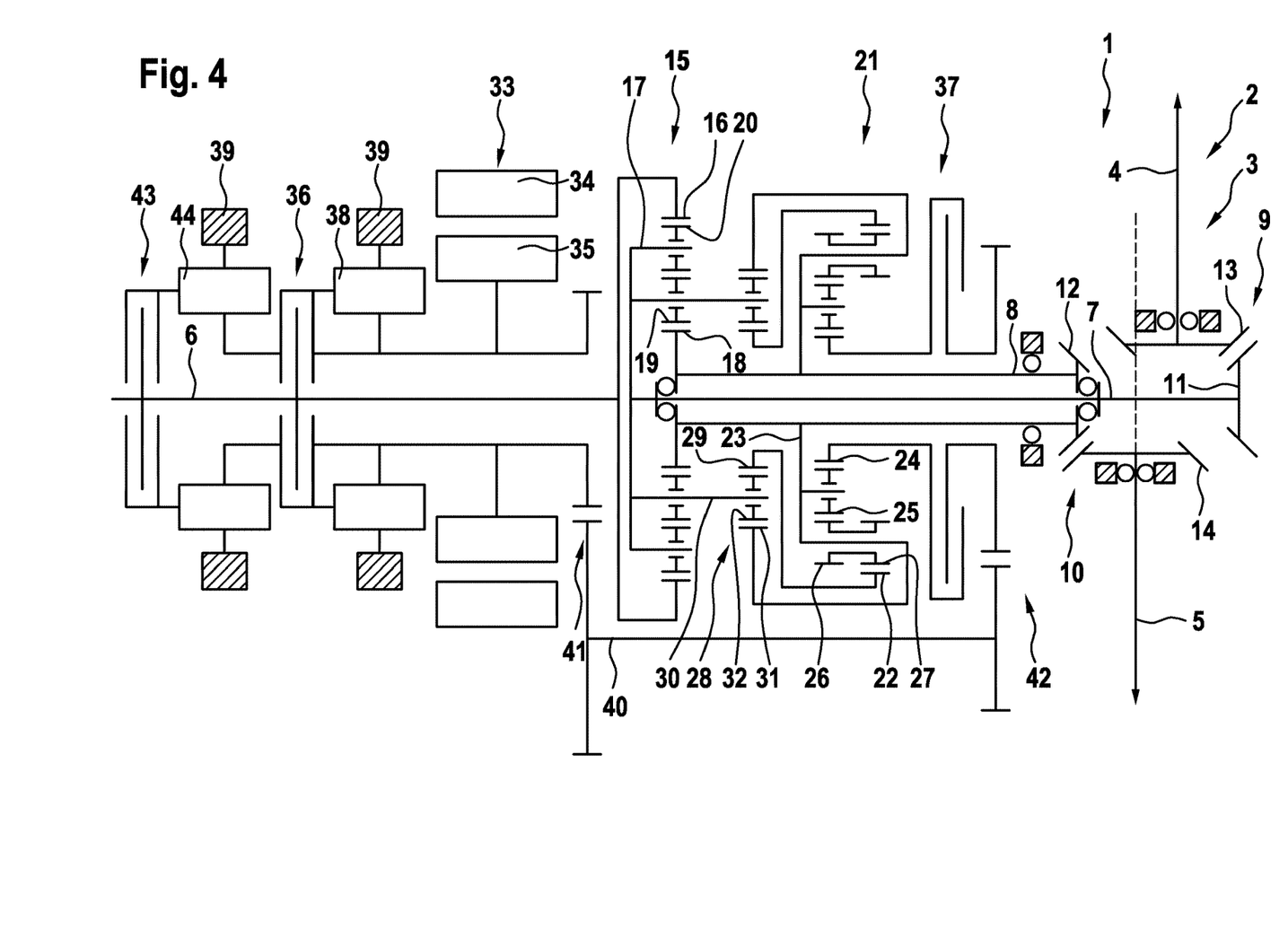

FIG. 4 shows a fourth embodiment of the gearing device, which largely corresponds to the third embodiment. However, another first clutch 43 is provided here, which can be operationally connected via another gear stage 44 to the gear stage 38. In this respect, the first clutch 36 is operationally connected only via the gear stage 38, the other first clutch 43 of the opposite transmission stage of both transmission stage 38 and the transmission stage 44 with the electrical engine 33. An operational connection between the electrical engine 33 and the input shaft 6 can be established similarly to clutch 36 via the clutch 43. Depending on which of the clutches 36 and 43 is closed, a different transmission ratio can be thus realized between the electrical engine 33 and the input shaft 6.

Figure 5:
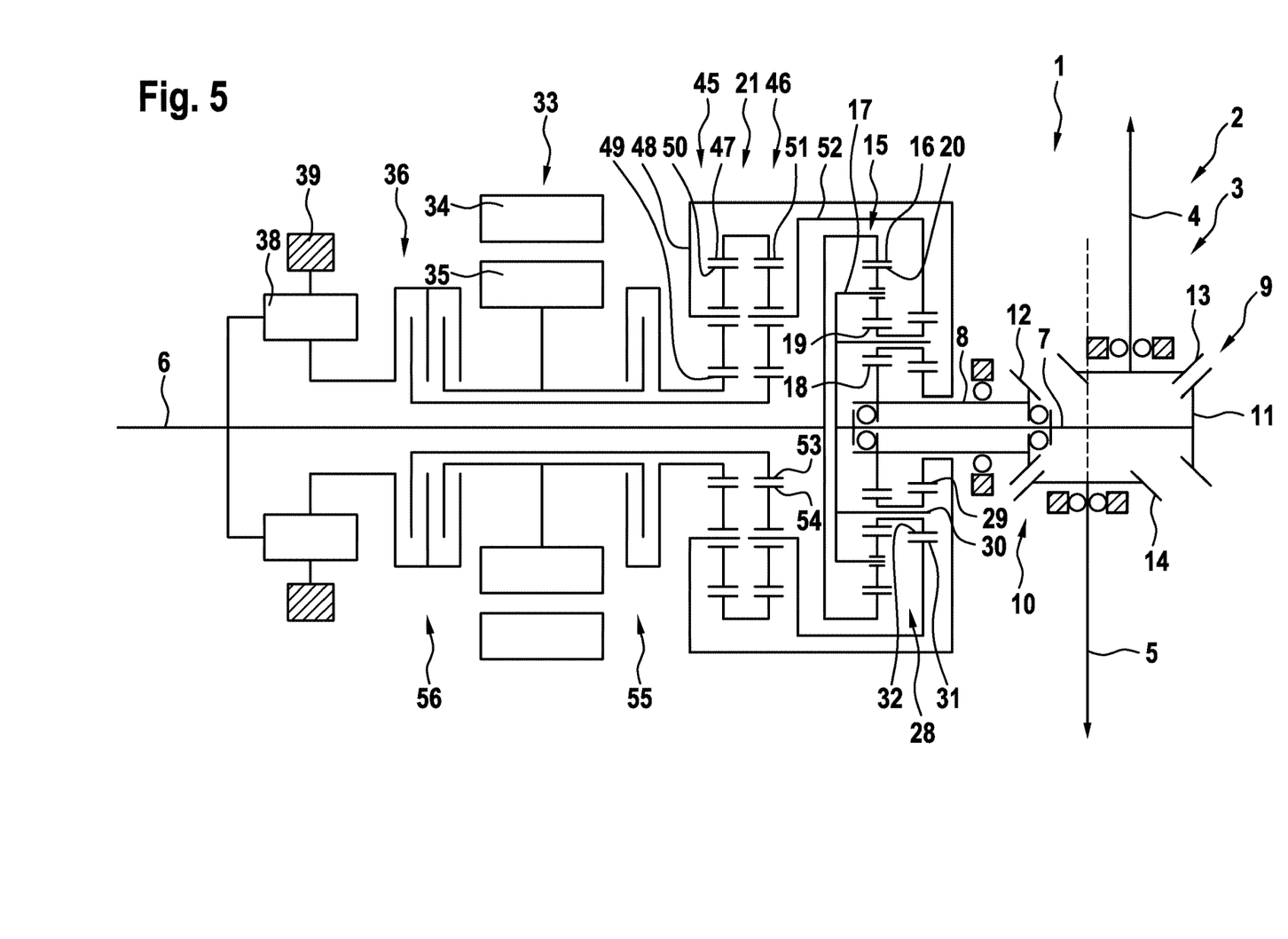

FIG. 5 shows a fifth embodiment of the gearing device 1. In principle, the previous embodiments are again referred to and only the differences will be discussed in the following. The torque distribution gear 21 is now designed as a planetary gear having a first planetary wheel set 45 and a second planetary wheel set 46. The first planetary wheel set 45 is provided with a first torque distribution gear ring wheel 47, with a first torque distribution gear planetary carrier 48 and with a first torque distribution gear sun wheel 49. On the first torque gear planetary carrier 48 is rotatably mounted a first torque distribution gear planetary wheel 50. Similarly, the second planetary wheel set 46 is provided with a second torque distribution gear ring wheel 51, a second torque distribution gear planetary gear carrier 52 and a second torque distribution gear sun wheel 53.

On the second torque distribution gear planetary carrier is rotatably mounted a second torque distribution gear planetary wheel 54. The first torque distribution gear planetary wheel 50 meshes with the first torque distribution gear ring wheel 47 and with the first distribution gear sun wheel 49. The second torque distribution gear planetary wheel 54 meshes with the second torque distribution gear ring wheel 51 and with the second torque distribution gear sun wheel 53. The first torque distribution gear ring wheel 47 and the second torque distribution gear ring wheel 51 can be designed as common torque distribution gear ring wheels.

The first torque distribution gear planetary gear 48 is operationally connected directly to the intermediate gear sun wheel 29 and/or the second torque distribution gear planetary carrier 52 is operationally connected directly to the intermediate gear ring wheel 31, in particular rigidly and and/or permanently. The intermediate gear is now here provided with the special feature in that the intermediate gear planetary wheel 32 is operationally connected directly with the differential gear inner planetary wheel 19, or alternatively with the differential gear outer planetary wheel 20, preferably rigidly and/or permanently. The above named planetary gear can be in this respect provided as a common gear.

According to the embodiments described above, the electrical engine 33 can be coupled via a first clutch 36 with the input shaft 6, preferably via the gear stage 38. In contrast to the embodiments above, however, two second clutches 55 and 56 are provided instead of the second clutch 37. The electrical engine can be operationally connected with the first torque distribution gear sun wheel 49 by means of the second clutch 55. The second torque distribution gear sun wheel 53 can be connected by through the other second clutch 56 to the input shaft 6 via the gear stage 38. With this embodiment of the first clutch 36, the electrical engine does not need to be braked to its standstill state when switching from a TSG operation when using the first clutch 36 to a "torque vectoring" operation while using the clutches 55 and 56.

Figure 6:
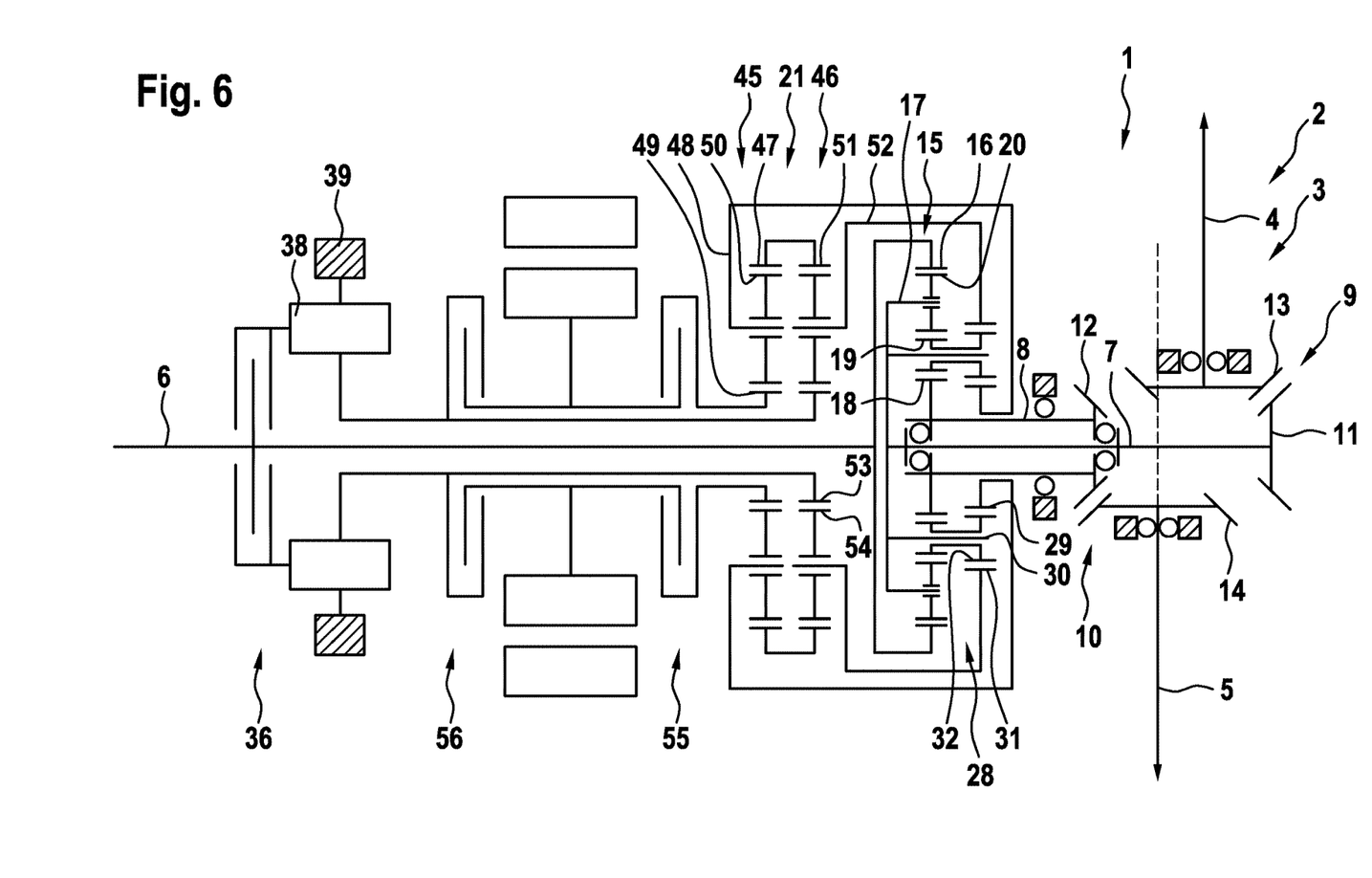

FIG. 6 shows a sixth embodiment of the gearing device 1, which is based on the fifth embodiment. To this extent, reference is thus made to the explanations above. The difference here is that there is a different arrangements of the clutches 36 and 56 relative to each other. While within the context of the fifth embodiment of the gearing device 1, the gearing stage 38 was arranged on the side of the clutch 36 facing away from the electrical engine 3, the gear stage 38 is now provided in the operational connection between the gear stage 38 and the input shaft 6. Moreover, the torque distribution gear sun wheel 53 can be connected via the gear stage 38 by means of the clutch 36 with the input shaft 6.

The invention claimed is:

1. Gearing device for a motor vehicle, comprising:
   an input shaft that can be connected with a drive unit, as well as a first output shaft and a second output shaft, wherein the first output shaft is operationally connected via a first gear with a first partial shaft of a wheel axle, and the second output shaft is operationally connected via a second gear with a second partial shaft of the wheel axle,
   wherein the gearing device is equipped with a differential gear by means of which the first output shaft and the second output shaft are operationally connected in a permanent manner with the input shaft, and that the gearing device is provided with an electrical engine, which can be operationally connected via a first clutch and with a first transmission ratio with the input shaft, and via a second clutch and with a second transmission ratio with a torque distribution gear of the gearing device.

2. The gearing device according to the claim 1, wherein the differential gear is provided as a planetary gear, which is equipped with a differential gear ring wheel, with a differential gear planetary carrier and with a differential gear sun wheel, wherein the differential gear ring wheel is operationally connected directly with the input shaft, the differential gear planetary carrier is operationally connected directly with the first output shaft, and the differential gear sun wheel is operationally connected directly with the second output shaft.

3. The gearing device according to claim 1, wherein on the differential gear planetary carrier is rotatably mounted at least one differential gear inner planetary wheel and a differential gear outer planetary gear that meshes with the differential gear inner planetary gear, wherein the differential gear outer planetary wheel meshes with the differential gear ring wheel, and the differential gear inner planetary wheel meshes with the differential gear sun wheel.

4. The gearing device according to claim 1, wherein the torque distribution gear is connected directly with the second output shaft and operationally connected with the first output shaft via the differential gear.

5. The gearing device according to claim 1, wherein the torque distribution gear is provided as a planetary gear that is equipped with a torque distribution gear ring wheel, with a torque distribution gear planetary carrier and with a torque distribution gear sun wheel, wherein the torque distribution gear ring wheel is connected directly with the differential gear, the torque distribution gear planetary gear is connected directly with the second output shaft, and the torque distribution gear sun wheel is operationally connected via the second clutch directly with the electrical engine.

6. The gearing device according to claim 1, wherein on the torque distribution gear planetary carrier are rotatably arranged a torque distribution gear inner planetary wheel and a torque distribution gear outer planetary wheel that meshes with the torque distribution gear inner planetary wheel, wherein the torque distribution gear inner planetary wheel meshes with the torque distribution gear sun wheel.

7. The gearing device according to claim 1, wherein the torque distribution gear outer planetary wheel meshes with the torque distribution gear ring wheel, or it is operationally connected with an auxiliary planetary wheel that meshes with the torque distribution gear ring wheel.

8. The gearing device according to claim 1, wherein the differential gear and the torque distribution gear are operationally connected via an intermediate gear, which is provided as a planetary gear and equipped with an intermediate gear sun wheel, an intermediate gear planetary carrier and an intermediate gear ring wheel, wherein on the intermediate gear planetary carrier is rotatably mounted an intermediate gear planetary wheel, which meshes with the intermediate gear sun wheel and with the intermediate gear ring wheel.

9. The gearing device according to claim 1, wherein the intermediate gear planetary carrier is operationally connected directly with the differential gear planetary carrier, and the intermediate gear sun wheel is operationally connected directly with the torque distribution ring wheel or the intermediate gear ring wheel is operationally connected directly with the torque distribution planetary carrier.

10. The gearing device according to claim 1, wherein the torque distribution gear is designed as a planetary gear provided with a first planetary wheel and a second planetary wheel set, wherein the first planetary wheel set is provided with a first torque distribution gear ring wheel, with a first torque distribution gear planetary carrier and with a first torque distribution gear sun wheel, and wherein the second planetary wheel set is provided with a second torque distribution gear ring wheel, with a second torque distribution gear planetary carrier and with a second torque distribution gear sun wheel.

* * * * *